No. 783,469. PATENTED FEB. 28, 1905.
M. C. SCHWEINERT & H. P. KRAFT.
CLAMPING DEVICE FOR PNEUMATIC TIRES.
APPLICATION FILED JUNE 3, 1904.

WITNESSES:
Fred White
René Bruine

INVENTORS:
Maximilian Charles Schweinert,
and Henry P. Kraft,
By Attorneys,
Arthur C. Fraser No. 783,469.

Patented February 28, 1905.

UNITED STATES PATENT OFFICE.

MAXIMILIAN CHARLES SCHWEINERT, OF WEST HOBOKEN, NEW JERSEY, AND HENRY P. KRAFT, OF NEW YORK, N. Y.

CLAMPING DEVICE FOR PNEUMATIC TIRES.

SPECIFICATION forming part of Letters Patent No. 783,469, dated February 28, 1905.

Application filed June 3, 1904. Serial No. 210,918.

*To all whom it may concern:*

Be it known that we, MAXIMILIAN CHARLES SCHWEINERT, residing at West Hoboken, in the county of Hudson and State of New Jersey, and HENRY P. KRAFT, residing in the city, county, and State of New York, both citizens of the United States, have jointly invented certain new and useful Improvements in Clamping Devices for Pneumatic Tires, of which the following is a specification.

This invention relates to clamping devices for pneumatic tires and aims to provide certain improvements therein.

Pneumatic tires for automobiles or other heavy vehicles are now commonly made with an inner air-tube and an outer shoe, the latter having its edges enlarged to form flanges which fit within circumferential recesses or channels formed in the wheel-rim, the shoe being held in place by clamping devices disposed at intervals around the rim and having retaining blocks or plates of appropriate shape fitting between the inner edges of the tire-shoe and holding the flanges thereof securely in place within the channels of the rim. In the usual form of such clamping devices the retaining-plates are fitted with long screw-threaded bolts which pass through the rim and receive nuts or similar devices which bear against the inner face of the rim and hold the plates in position.

Our invention relates to an improved form of nut for such purpose and presents certain advantages over those now in use.

Figure 1:
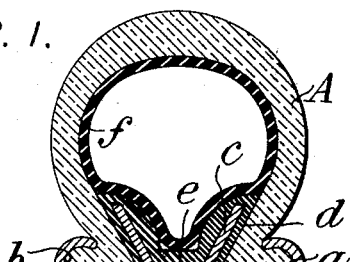
Figure 2:
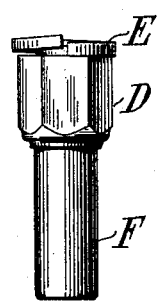
Figure 3:
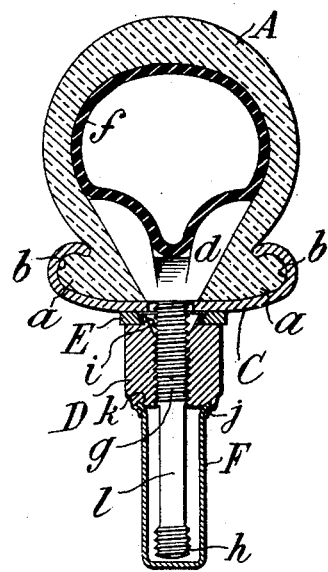
Figure 4:
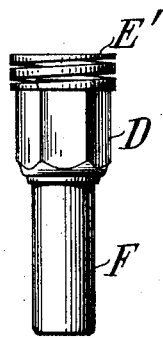
Figure 5:
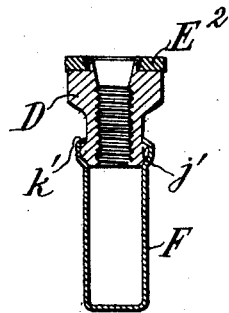

Referring to the accompanying drawings, which illustrate our invention as applied to an automobile-tire, Figure 1 is a sectional view showing our improved nut in position. Fig. 2 is an elevation of the nut. Fig. 3 is a view similar to Fig. 1, illustrating the device when used in connection with a different form of wheel-rim. Fig. 4 is an elevation illustrating a modified form of washer. Fig. 5 is a sectional view illustrating a modification in the manner of fastening the nut proper to its cylindrical extension.

Referring to the drawings, let A indicate the outer shoe of a pneumatic tire having the usual laterally-extending flanges $a$, which fit in corresponding circumferential channels $b$, formed in the vehicle-felly B. The latter is usually provided with a steel rim C, as shown in Fig. 1, which has its edges curled or bent circumferentially to form the channels $b$. The shoe A is retained in place with its flanges in the channels $b$ by a series of clamping devices arranged at intervals around the circumference of the wheel, six or eight being usually employed. Each of the clamping devices preferably consists of a retaining plate or block $c$, of iron or other metal, having a covering of rubber $d$ and of appropriate shape to fit between the edges of the tire-shoe. In the present construction a substantially V-shaped plate is used, the inner side of the tire approaching that shape in cross-section. Each of the plates $c$ has connected to it a bolt $e$, which is designed to pass through the rim and to be engaged by a nut for the purpose of drawing down the plate to the bottom of the rim. The inner tube $f$ of the tire in use lies over the plates $c$, as shown in Figs. 1 and 3, so that the bolts $e$ do not pass through the tube. Each of the bolts $e$ is screw-threaded at $g$ near its point of connection with the plate $c$ to receive the clamping-nut D, to which our invention especially relates. In adjusting the tire upon the rim it is very difficult to press the retaining-plates to their clamping positions, and for this reason it has been found practically necessary to make the bolts $e$ of considerable length, so that they can be passed inwardly through the holes in the rim, at least to a sufficient extent to permit of their being grasped by a tool, the usual practice being to provide a screw-thread $h$ at the extreme end of the bolt, so that it can be engaged by the clamping-nut, the latter being used as a sort of handle to pull down the retaining-plate to its clamping position. In this position a considerable part of the bolt projects inwardly beyond the rim, and it is very desirable that the part thus exposed should be protected from dust and injury to the threads. It has also been found that the ordinary clamping-nuts are very apt to work loose in use, being subjected to considerable strain and vibration. Our invention provides a clamping-nut which avoids this latter difficulty, which efficiently protects the bolt, which has no separable parts, and which is of cheap and durable construction.

The nut proper, D, is of the ordinary square or hexagonal cross-section and has swiveled thereto a washer E, which is preferably of spiral form, so as to more efficiently constitute a locking means for the nut when the latter is screwed home. Fig. 2 illustrates the device before it is applied to the bolt, and Fig. 1 shows it after such application, the washer being flattened out to a considerable extent when the nut is in its adjusted position. The particular method of swiveling the nut and washer which we prefer to follow is that shown wherein the washer is formed with a beveled inner edge and the nut with a longitudinally-extending flange $i$, which is swaged out with a spreading-tool after the washer is in place. We have found in practice that such a construction affords a practical means for locking the nut, while permitting its frequent removal and replacement without loss of efficiency. In order to fully protect the exposed end of the bolt, we form the nut with an elongated cylindrical extension F, which is secured to the nut proper in any suitable manner and which constitutes an inclosed casing for the projecting part of the bolt. The extension F is formed of sheet metal (usually brass) drawn to deep-cup form, as shown, and preferably joined to the nut by turning over flange $j$, formed upon the nut upon a corresponding flange $k$, formed upon the extension, as shown in Figs. 1 and 3. The bolts $e$ not only vary in length, but owing to the differences in thickness of the rims to which the clamping devices are applied the bolts project to varying degrees beyond the rim. As shown in Fig. 3, the wooden rim or felly B is omitted, and the bolt has hence a much greater degree of projection than in Fig. 1. The extension F should therefore not only be of sufficient length to accommodate the normal length of bolt exposed, but should also be long enough to allow for considerable variation in the degree of projection of the bolt due to such differences in thickness of the rim or other causes. It has been proposed to make a nut of sufficient length from a single piece of metal; but such a construction has several disadvantages which are not present in our invention. The method commonly employed in making nuts of this kind is to cut them from a hexagonal rod, and this in a long nut occasions a great waste of metal. Another consideration is that the bore of the nut must be screw-threaded to its full length or must be enlarged with an expanding-tool beyond the point required for a proper engagement with the bolt. The latter expedient is usually resorted to so as to shorten the screw-threaded portion of the nut and permit the latter to slip past the usual blank space $l$ of reduced diameter formed upon the bolt between the threads $g$ and $h$, thereby lessening the labor of screwing on the nut. In our invention the nut proper may be made of just sufficient length to properly clamp the bolt and is preferably screw-threaded throughout its length, as shown. The cylindrical extension F is of sufficient diameter to pass freely over the bolt and the use of an expanding-tool is avoided as well as the necessity for forming a useless thread in the extension, the principal if not the only function of which is to protect the bolt. Our invention therefore cheapens the cost of manufacture without loss of efficiency, as the cup-shaped extension can be easily made of sufficient rigidity to adequately protect the bolt by the use of comparatively thin metal. Moreover, our improved device presents no difference in appearance over a correspondingly-shaped integral construction.

Our invention is susceptible of considerable modification. In Fig. 4, for instance, we have illustrated a washer E', which is in the form of a double spiral, which is compressed against the rim as the nut is screwed home. In some instances it is advisable to use a flat continuous washer $E^2$, as shown in Fig. 5. This figure also illustrates an obvious modification in the method of attaching the extension to the nut proper wherein the nut is formed with a shoulder $j'$, over which the end of the extension is bent, as shown at $k'$. Other modifications will suggest themselves.

We claim as our invention the following-defined novel features, substantially as hereinbefore specified, namely:

1. In a clamping device, the combination of a nut, and a spiral washer swiveled thereto, the outer face of the washer extending beyond the nut.

2. In a clamping device, the combination of a nut, and a spiral washer swiveled thereto, said washer having a beveled inner edge and said nut having a flange overlying such edge, the outer face of said washer extending beyond the outer edge of said flange.

3. In a clamping device, the combination of a nut proper having an elongated extension secured thereto, said extension being formed of sheet metal and having an internal diameter greater than that of said nut, whereby said extension is adapted to form a protecting-casing for a bolt.

4. In a clamping device, the combination of a nut having at one end a washer swiveled thereto and having secured thereto at the other end an elongated sheet-metal extension having an enlarged socket and being adapted to form a protecting-casing for a bolt.

5. In a clamping device, the combination of a nut having at one end a spiral washer swiveled thereto, and at the other end an elongated sheet-metal extension adapted to form a protecting-casing for a bolt.

6. In a clamping device, the combination with a bolt having an intermediate reduced portion between its ends, of a nut proper having a screw-threaded portion of less length than such reduced portion of the bolt, and having an elongated cylindrical sheet-metal extension fixed thereto, said extension being of greater diameter than said bolt.

7. In a clamping device, the combination with a bolt having an intermediate reduced portion between its ends, of a nut proper having at one end a washer swiveled thereto, and having fixed thereto at its other end an elongated sheet-metal extension of greater diameter than said bolt, and having an intermediate screw-threaded portion of less length than the reduced portion of the bolt.

In witness whereof we have hereunto signed our names in the presence of two subscribing witnesses.

M. CHARLES SCHWEINERT.
HENRY P. KRAFT.

Witnesses:
FRED WHITE,
EUGENE G. MYERS.